(12) United States Patent
Herle et al.

(10) Patent No.: US 11,398,989 B2
(45) Date of Patent: *Jul. 26, 2022

(54) CLOUD SERVICE FOR CROSS-CLOUD OPERATIONS

(71) Applicant: ServiceNow, Inc., Santa Clara, CA (US)

(72) Inventors: Varsha Herle, Bothell, WA (US); Kavish Jain, Bellevue, WA (US); Sharath Vaddempudi, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,787

(22) Filed: Jan. 6, 2021

(65) Prior Publication Data

US 2021/0136004 A1    May 6, 2021

Related U.S. Application Data

(63) Continuation of application No. 16/670,591, filed on Oct. 31, 2019, now Pat. No. 10,917,358.

(51) Int. Cl.
*G06F 13/00* (2006.01)
*H04L 47/783* (2022.01)
(Continued)

(52) U.S. Cl.
CPC .......... *H04L 47/783* (2013.01); *H04L 47/828* (2013.01); *H04L 61/2007* (2013.01); *H04L 67/104* (2013.01)

(58) Field of Classification Search
CPC . H04L 47/783; H04L 47/828; H04L 61/2007; H04L 67/104; H04L 67/10; G06F 9/5072
(Continued)

(56) References Cited

U.S. PATENT DOCUMENTS 6,321,229 B1    11/2001  Goldman
6,678,887 B1    1/2004   Hallman
(Continued)

OTHER PUBLICATIONS

International Search Report & Written Opinion for PCT Application No. PCT/US2020/058022 dated Feb. 10, 2021; 8 pgs.

*Primary Examiner* — Kenneth R Coulter
(74) *Attorney, Agent, or Firm* — Fletcher Yoder PC

(57) ABSTRACT

A disclosed cloud service (CS) enables cross-cloud access to data resources and cross-cloud execution of orchestrations, including automations. The CS includes a peer-to-peer (P2P) cloud orchestrator service (COS) and a cloud broker service (CBS). The COS enables P2P identification and communication routing between different cloud computing environments. The CBS enables cross-cloud access to data and orchestrations (e.g., one or more scripts, workflows, and/or scheduled jobs) from different cloud computing environments. Additionally, the data center may be configured to route all orchestration calls of a data center through the CS, such that the CS can ensure that references to local data and orchestrations are handled within the data center, while references to data and orchestrations of a different data center are suitably routed to be handled by a corresponding CS of the appropriate data center.

20 Claims, 10 Drawing Sheets

(51) Int. Cl.
*H04L 47/70* (2022.01)
*H04L 61/5007* (2022.01)
*H04L 67/104* (2022.01)

(58) Field of Classification Search
USPC ....... 709/201, 249, 250, 226, 243, 238–242, 709/229, 225
See application file for complete search history.

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,880,002 B2 | 4/2005 | Hirschfeld et al. |
| 6,895,586 B1 | 5/2005 | Brasher |
| 7,020,706 B2 | 3/2006 | Cates |
| 7,027,411 B1 | 4/2006 | Pulsipher |
| 7,350,209 B2 | 3/2008 | Shum |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,890,802 B2 | 2/2011 | Gerber |
| 7,925,981 B2 | 4/2011 | Pourheidari |
| 7,933,927 B2 | 4/2011 | Dee |
| 7,945,860 B2 | 5/2011 | Vambenepe |
| 8,082,222 B2 | 12/2011 | Rangarajan |
| 8,151,261 B2 | 4/2012 | Sirota |
| 8,317,327 B2 | 11/2012 | Cleveland et al. |
| 8,380,645 B2 | 2/2013 | Kowalski |
| 8,402,127 B2 | 3/2013 | Solin |
| 8,429,630 B2 | 4/2013 | Nickolov |
| 8,554,750 B2 | 10/2013 | Rangaranjan |
| 8,612,408 B2 | 12/2013 | Trinon |
| 8,646,093 B2 | 2/2014 | Myers |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,965,957 B2 | 2/2015 | Barros |
| 8,983,982 B2 | 3/2015 | Rangarajan |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,323,801 B2 | 4/2016 | Morozov |
| 9,363,252 B2 | 6/2016 | Mueller et al. |
| 9,363,327 B2 | 6/2016 | Mueller |
| 9,432,454 B2 | 8/2016 | Chakraborty et al. |
| 9,412,084 B2 | 9/2016 | Kowalski |
| 9,442,671 B1 | 9/2016 | Zhang |
| 9,467,344 B2 | 10/2016 | Gere |
| 9,508,051 B2 | 11/2016 | Falk |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,684,502 B2 * | 6/2017 | Fu ............... H04L 67/34 |
| 9,716,634 B2 | 7/2017 | Sapuram et al. |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,910,906 B2 * | 3/2018 | Karve ............... G06F 16/178 |
| 9,967,318 B2 * | 5/2018 | Fu ............... H04L 67/10 |
| 10,002,203 B2 | 6/2018 | George |
| 10,129,177 B2 | 11/2018 | Chang et al. |
| 10,255,335 B2 * | 4/2019 | Ding ............... G06F 16/248 |
| 10,284,433 B2 * | 5/2019 | Karve ............... H04L 67/1097 |
| 10,326,835 B1 | 6/2019 | Guo et al. |
| 10,360,072 B2 * | 7/2019 | Jubinski ............... G06F 9/5083 |
| 10,452,430 B2 * | 10/2019 | Maskalik ............ G06F 9/5077 |
| 10,484,341 B1 | 11/2019 | Todd et al. |
| 10,917,358 B1 * | 2/2021 | Herle ............... H04L 47/783 |
| 2009/0276771 A1 | 11/2009 | Nickolov et al. |
| 2012/0158821 A1 | 6/2012 | Barros |
| 2013/0054634 A1 | 2/2013 | Chakraborty et al. |
| 2014/0372533 A1 * | 12/2014 | Fu ............... G06F 9/5072 709/204 |
| 2015/0163179 A1 | 6/2015 | Maes et al. |
| 2015/0263894 A1 | 9/2015 | Kasturi et al. |
| 2016/0065417 A1 | 3/2016 | Sapuram et al. |
| 2016/0378450 A1 * | 12/2016 | Fu ............... G06F 8/60 717/177 |
| 2016/0378844 A1 * | 12/2016 | Karve ............... G06F 16/2365 707/620 |
| 2016/0380840 A1 * | 12/2016 | Karve ............... H04L 67/06 709/223 |
| 2017/0090995 A1 | 3/2017 | Jubinski et al. |
| 2017/0257432 A1 * | 9/2017 | Fu ............... H04L 67/2823 |
| 2017/0339070 A1 | 11/2017 | Chang et al. |
| 2018/0060117 A1 | 3/2018 | Maskalik et al. |
| 2019/0065277 A1 | 2/2019 | Raikov et al. |
| 2019/0087445 A1 | 3/2019 | Zhu |

* cited by examiner

CLOUD SERVICE FOR CROSS-CLOUD OPERATIONS

CROSS REFERENCE TO RELATED APPLICATIONS

This application is a continuation of U.S. application Ser. No. 16/670,591, entitled "CLOUD SERVICE FOR CROSS-CLOUD OPERATIONS," filed Oct. 31, 2019, which issued as U.S. Pat. No. 10,917,358, on Feb. 9, 2021, which is hereby incorporated by reference in its entirety for all purposes.

BACKGROUND

The present disclosure relates generally to cloud computing and, more specifically, to a cloud-to-cloud broker service that enables platform orchestration across a number of different clouds.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

A data center, as discussed herein, can include a number of hardware servers arranged into groups or pods that support the operation of a cloud computing environment. Each pod may hosts a suitable number of instances, which may include, for example, developer instances, production client instances, test client instances, shared or enterprise instances, and so forth. The life cycles of these instances may include allocation, replication/cloning, backup/restore, fail-over, and so forth, within the cloud computing environment. As such, a cloud may include automations that are executed to manage the lifecycles of hosted instances. As used herein, an "automation" refers to an orchestration that controls or otherwise maintains instance lifecycles. As used herein, an "orchestration" refers to computer executable or interpretable instructions (e.g., one or more scripts, workflows, sub-workflows, operations, sub-operations, and/or scheduled jobs) that, when executed by a suitable computing system, perform administrative functions within a cloud environment. As such, an automation of a particular cloud generally includes references to data and/or executable instructions hosted by the particular cloud.

Additionally, certain cloud computing environments are associated with particular security restrictions. For example, a private cloud may have quarantine restrictions that specify that all data storage and processing occurs within the private cloud for enhanced security and/or regulatory compliance. Additionally, certain cloud computing environments provide different features, such as different hardware restrictions, bandwidth restrictions, application frameworks, and so forth. As such, as the needs of an organization changes, it may be desirable to migrate an instance from one cloud computing environment to another. However, while automations are typically used to handle instance life cycle tasks, automations are specific to a particular cloud computing environment and, as such, automations would have to be customized for each cross-cloud instance migration. As such, it is presently recognized that there is a need for a system to orchestrate the execution of automations between different cloud environments that can enable cross-cloud automation actions, such as cross-cloud instance migration.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a cloud service (CS) that enables the cross-cloud access to data resources and cross-cloud execution of orchestrations, including automations. The CS includes a peer-to-peer (P2P) cloud orchestrator service (COS) and a cloud broker service (CBS). The COS enables P2P identification and communication routing between different cloud computing environments. Additionally, the COS controls operation of the CBS, which enables cross-cloud access to data and orchestrations (e.g., one or more scripts, workflows, and/or scheduled jobs) from different cloud computing environments. Additionally, the data center may be configured to route all orchestration calls of a data center through the CS, such that the CS can ensure that references to local data and orchestrations are handled within the data center, while references to data and orchestrations of a different data center are suitably routed to be handled by a corresponding CS of the appropriate data center. As such, existing automations defined within a cloud computing environment can be leveraged by the CS to enable cross-cloud operations without modification, providing a considerable gain in efficiency, cost reduction, and error reduction. For example, using the disclosed CS, well-established automations for allocation, replication/cloning, backup/restore, and so forth, of instance within a cloud computing environment may be used to enable effective P2P, cross-cloud instance migration with minimal downtime, no data loss, and high move stability. Additionally, the CS can enable other cross-cloud operations, such as cross-cloud health monitoring. Furthermore, the CBS of the CS can be configured to restrict to local access certain data and/or orchestrations for enhanced security and/or regulatory compliance.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
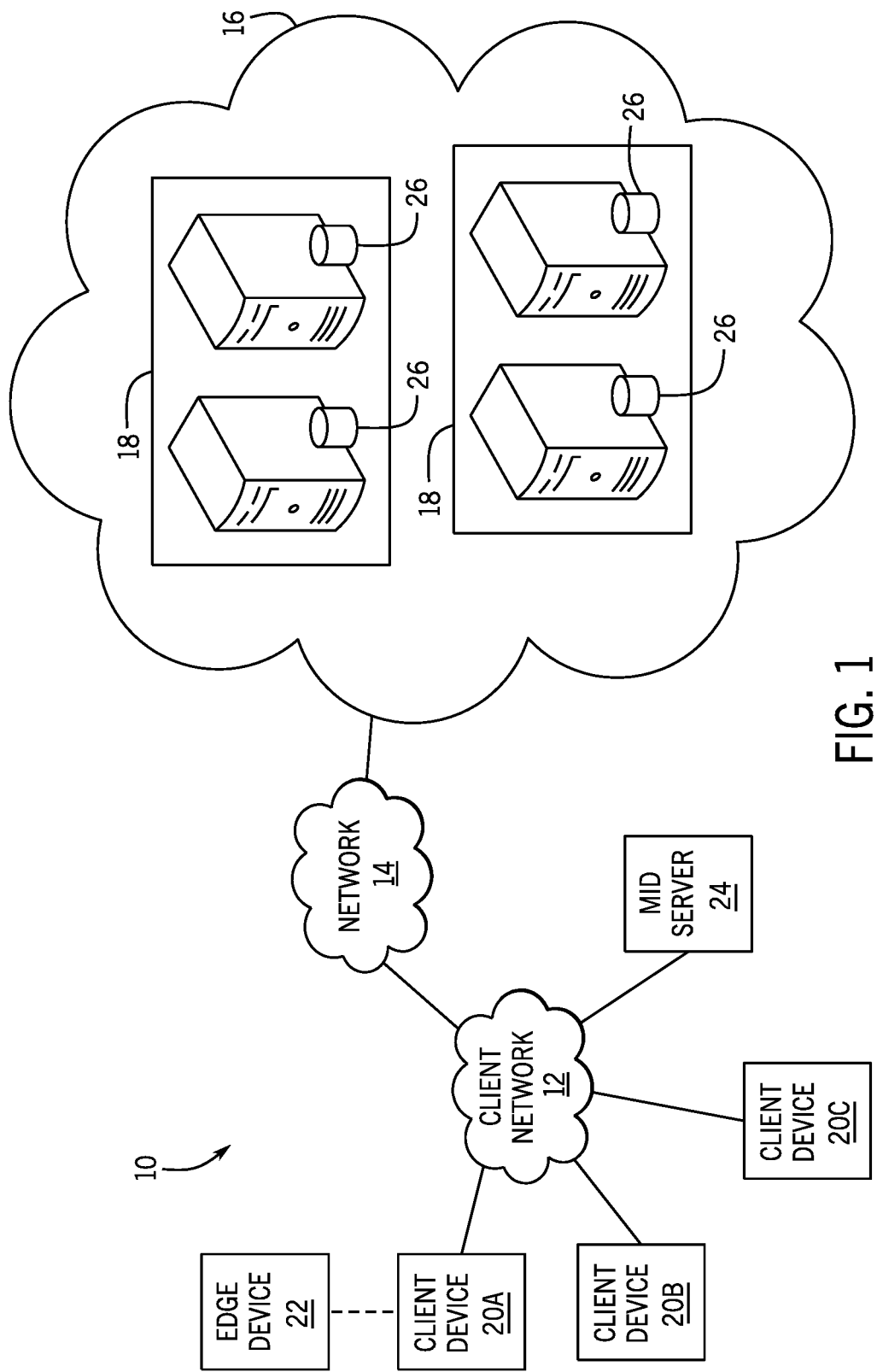
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As mentioned, automations are executed by data centers of a cloud computing environment to manage instance life cycles. However, since automations are data center-specific, there is not a standardized framework by which a first data center hosting a first cloud can trigger the execution of automations by a second data center hosting a second cloud, or receive information about the performance of the automation. As such, even though automations may be defined to handle life cycle operations (e.g., allocation, replication/cloning, backup/restore, and fail-over) within a data center or cloud, they are not generally available to be called or accessed by another data center or cloud.

With the foregoing in mind, present embodiments are directed to a cloud service (CS) that enables cross-cloud execution of automations. The CS includes a peer-to-peer (P2P) cloud orchestrator service (COS) and a cloud broker service (CBS). The COS enables P2P identification and communication routing between different cloud computing environments. The CBS enables cross-cloud access to data and orchestrations (e.g., one or more scripts, workflows, and/or scheduled jobs) from different cloud computing environments. Additionally, the data center may be configured to route all orchestration calls of a data center through the CS, such that the CS can ensure that references to local data and orchestrations are handled within the data center, while references to data and orchestrations of a different data center are suitably routed to be handled by a corresponding CS of the appropriate data center. As such, existing automations defined within a cloud computing environment can be leveraged by the CS to enable cross-cloud operations without modification, providing a considerable gain in efficiency, cost reduction, and error reduction. For example, using the disclosed CS, well-established automations for allocation, replication/cloning, backup/restore, and so forth, of a cloud computing environment may be used to enable effective P2P, cross-cloud instance migration with minimal downtime, no data loss, and high move stability. Additionally, the CS can enable other cross-cloud operations, such as cross-cloud health monitoring. Furthermore, the CBS of the CS can be configured to restrict to local access certain data and/or orchestrations for enhanced security and/or regulatory compliance.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
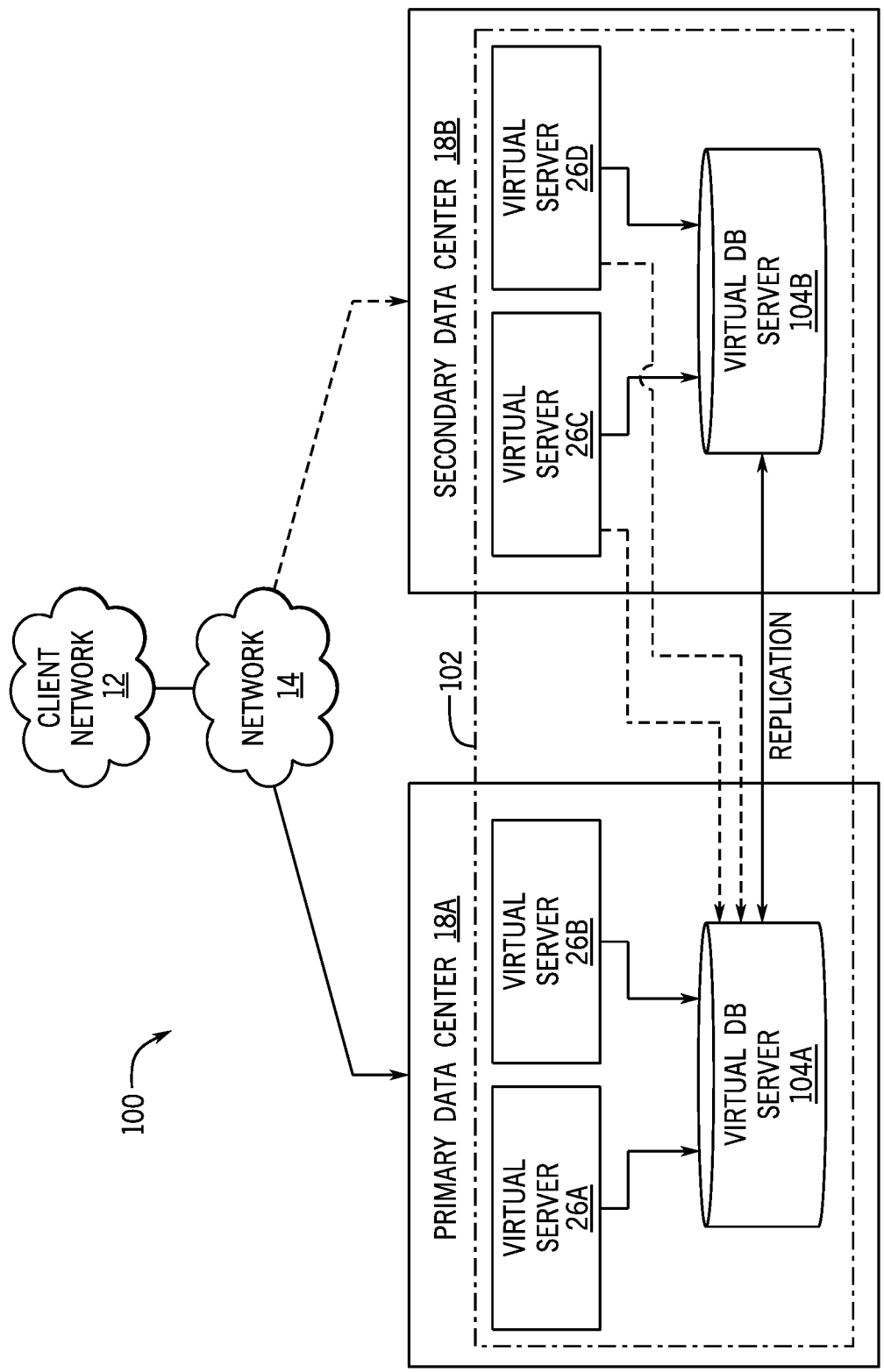
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
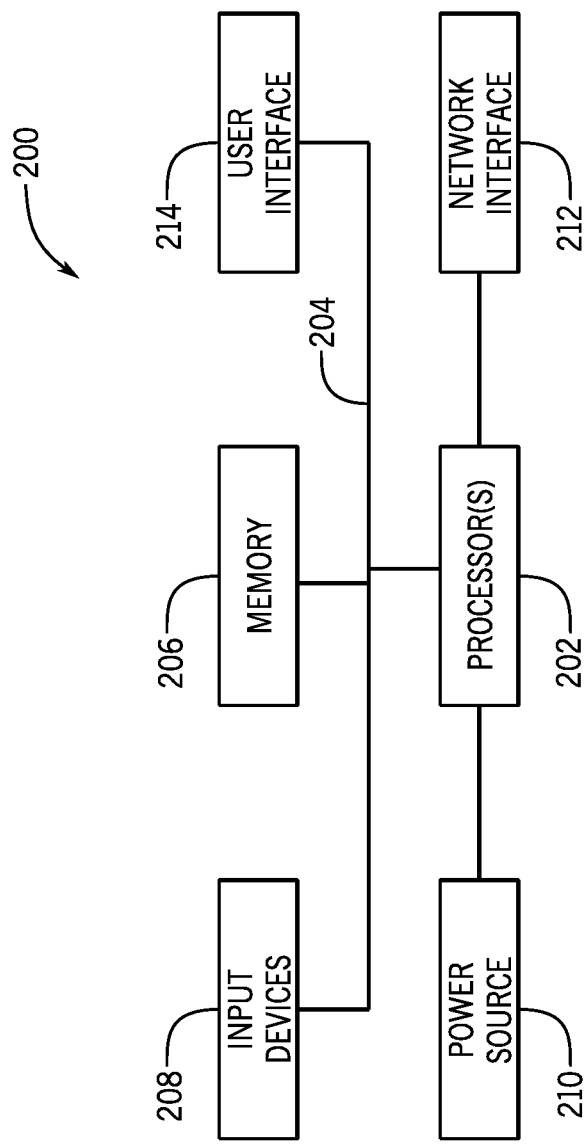
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
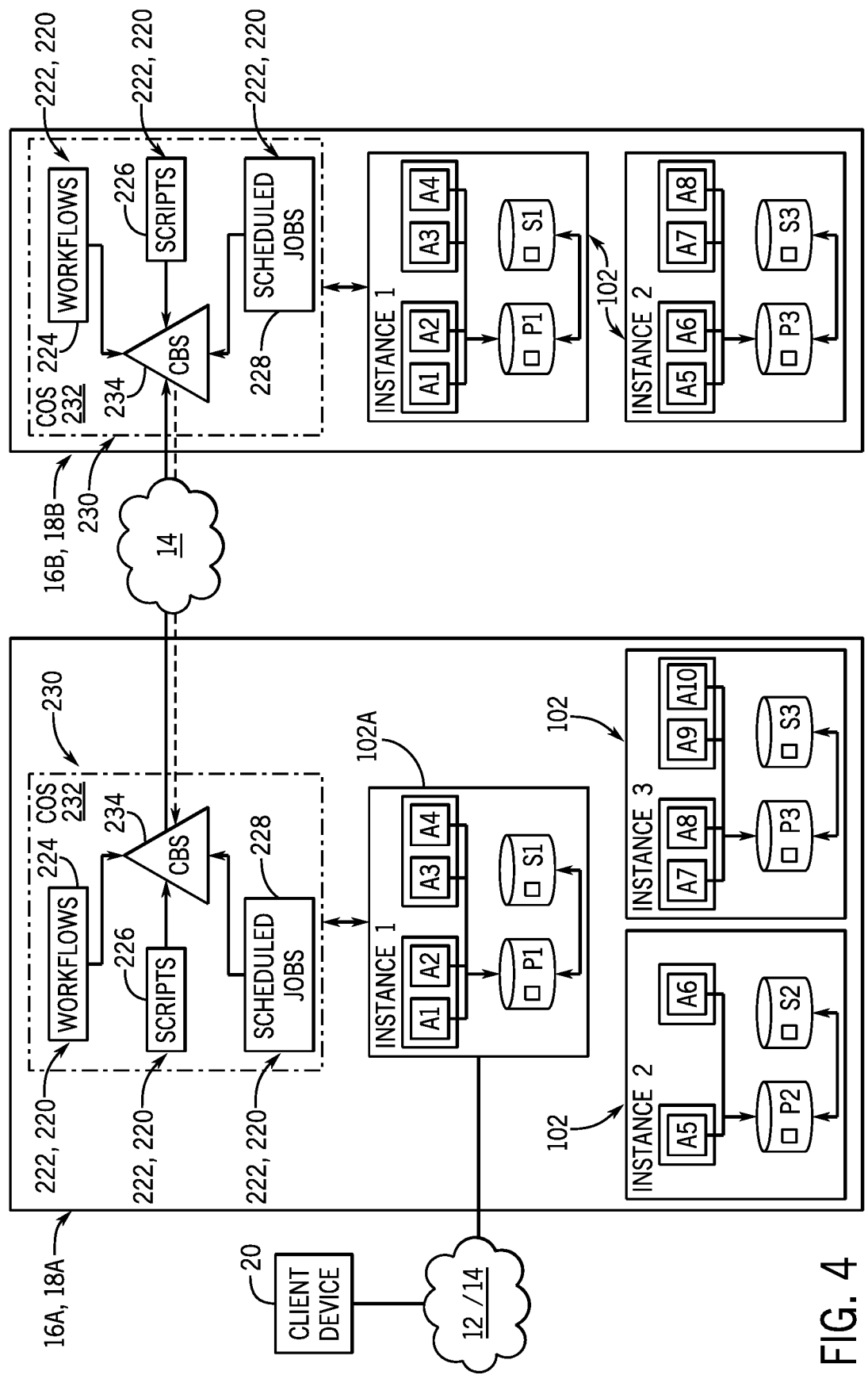
FIG. 4 is a diagram illustrating an example embodiment that includes two clouds respectively hosted by two data centers, each having a respective cloud service (CS) that enables cross-cloud access of data and instructions, in accordance with aspects of the present disclosure.

With the preceding in mind, FIG. 4 is a diagram illustrating an example embodiment that includes two service provider cloud-based platforms 16A and 16B, which may be referred to herein as simply "clouds". As discussed above, each of the clouds 16A and 16B is hosted by suitable processing and storage resources associated with a respective data center 18A and 18B. Additionally, each data center 18 hosts a number of instances 102, such as client instances, enterprise or shared instances, test instances, developer instances, and the like. Each of the instances 102 includes virtual servers 26 and virtual database servers 104 that support operation of each instance, as discussed above. For example, instances 102A is a client instance hosting a configuration management database (CMDB) that stores configuration items (CIs) for resources and assets associated with the client. As such, instance 102A is generally configured to support a plurality of end-user devices, such as client device(s) 20, concurrently, wherein each end-user device is in communication with the client instance 102A via the client network 12 and/or the network 14. The clouds 16 may be configured to support any suitable number of concurrent instances.

For the illustrated embodiment, each of the clouds 16A and 16B is respectively supported or hosted by data center(s) 18A and 18B. In other embodiments, each of the clouds 16A and 16B is hosted by a number of different data centers 18, which may each be located in different geographical positions. Additionally, in certain embodiments, the data centers 18 may be further subdivided into groups of hardware servers, referred to as "pods". The clouds 16 may be hosted by or associated with different cloud-based enterprises, companies, services, or technologies. Each data center (or each pod of each data center, depending on the data center organization), stores automations 220 that are responsible for managing the lifecycles of hosted instances 102. These automations 220 may be defined in one or more orchestrations 222 (e.g., workflows 224, scripts 226, and/or scheduled jobs 228) that are executed by suitable processing circuity of the data centers 18 to create, maintain, and remove their respective hosted client instances 102. For example, automations 220 may be defined to handle resource allocation when creating new instances, manage replication/cloning of instances, manage same-cloud instance migration, perform backup/restore of instance database servers, manage failover of virtual servers and/or database servers, handle instance termination, manage the release or reallocation of instance resources after instance termination, and so forth. In the absence of the present disclosure, these automations 220 are independently executed by each data center 18A and 18B to manage instances 102 of their respective clouds 16A and 16B, and as such, cloud 16B and data center 18B are unable to access or trigger execution of the automations 220 defined in cloud 16A and data center 18A. As such, in the absence of the present disclosure, cross-cloud instance lifecycle operations, such as cross-cloud instance migration, are not possible.

With the foregoing in mind, present embodiments are directed to a cloud service (CS) that enables the cross-cloud data exchange and cross-cloud execution of automations. For the illustrated embodiment, both the data center 18A and the data center 18B host a respective CS 230. For embodiments in which the data centers 18A or 18B are organized into pods, each pod of the data center may host a respective CS 230. Each CS 230 includes a respective peer-to-peer (P2P) cloud orchestrator service (COS) 232 and a cloud broker service (CBS) 234. As discussed below, the COS 232 enables P2P identification and communication routing between the data centers 18 via a suitable network 14. That is, the COS 232 of data center 18A and the COS 232 of data center 18B enable the clouds 16A and 16B to identify one another, as well as other communicatively-coupled peer clouds, and to establish suitable communication routes (e.g., encrypted, P2P internet protocol (IP) channels) between the data centers 18. For example, when data center 18A seeks to have data center 18B execute an automation on cloud 16B, then the COS 232 of data center 18A may identify the COS 232 of data center 18B as hosting the cloud 16B having the desired automation. In certain embodiments, the COS 232 of data center 18A may provide a unicast query to the COS 232 of data center 18B to determine whether a resource (e.g., data, a database query, an orchestration) is available to be accessed or executed via the CBS 234 of data center 18B. For embodiments in which there are multiple peer clouds in the P2P network maintained by the COS 232 of each data center 18, the COS 232 of data center 18 may transmit a multicast query to all communicatively-coupled data centers hosting respective peer clouds, and may subsequently receive a response from the appropriate data center/cloud hosting a resource of interest. For such embodiments, the COS 232 of each data center 18 may maintain a collection of information regarding peer clouds, such as unique identifiers, IP addresses or uniform resource identifiers (URIs), routing tables, authentication credentials, and so forth, to enable operation of the P2P network between the COS 232 of each of the data centers 18 hosting these peer clouds. It may be appreciated that, in certain embodiments, communication between the CS 230 of data center 18A and the CS 230 of data center 18B may include representational state transfer (REST) messages, simple object access protocol (SOAP) messages, or messages in any other suitable style, format, or protocol.

For the illustrated embodiment, the COS 232 controls operation of the CBS 234, which enables cross-cloud access to data and instructions, such as orchestrations 222 and automations 220, between the clouds 16 via the network 14. In certain embodiments, the CBS 234 may be a customized CITRUS client, or another suitable enterprise application integration (EAI) platform. For the illustrated embodiment, the automations 220, namely the orchestrations 222 (e.g., workflows 224, scripts 226, and/or scheduled jobs 228) associated with instance life cycles, are executed via the CBS 234. Additionally, the CBS 234 seamlessly determines whether an automation is to be executed within a particular cloud, or whether the automation represents a cross-cloud operation. In other words, the CBS 234 abstracts both local and remote data and instructions (e.g., orchestrations, automations), such that the automations 220 are unaware whether they are being executed locally or remotely. By implementing the CBS 234 in this manner, previously unavailable cross-cloud operations can be implemented using established and tested local automations 220 already defined within the clouds 16, without modification, which significantly reduces development and debugging costs. Additionally, as mentioned, when cloud sequestration is desired, the CBS 234 can be configured to block or prevent particular data or instructions from being accessed by a peer cloud, while still enabling local access to the data or instructions within the sequestered cloud.

During operation of the illustrated embodiment, when the execution of a script 226 of an automation 220 is requested by the data center 18A, the instructions to be executed are provided to the CBS 234 of data center 18A for analysis. When the script of the automation 220 only includes references to resources (e.g., data and/or instructions) that are stored within the cloud 16A, then the CBS 234 executes the script locally, within the data center 18A. However, when the script 226 references data or instructions hosted by the cloud 16B, then the CBS 234 routes requests for the resource(s) to data center 18B. In certain embodiments, when an automation 220 executed by data center 18A includes a request (e.g., a create, read, update, or delete (CRUD) request) to access data hosted by data center 18B, then the CBS 234 of data center 18A may send a suitable request to access the data to the CBS of cloud 16B, based on the routing information stored by the COS 232 of clouds 16A and 16B. Subsequently, the CBS 234 of cloud 16B may respond by providing the requested data to the CBS 234 of cloud 16A, presuming the CBS 234 of cloud 16B is not restricted from exporting the requested data. In certain embodiments, when an automation executing on cloud 16A requests the execution of an automation hosted by cloud 16B, then the CBS 234 of cloud 16A may send a request for the CBS of cloud 16B to execute the automation, and may receive results (e.g., output data, status information, error information, etc.) from the CBS of cloud 16B produced by the execution of the requested automation at data center 18B.

Figure 5:
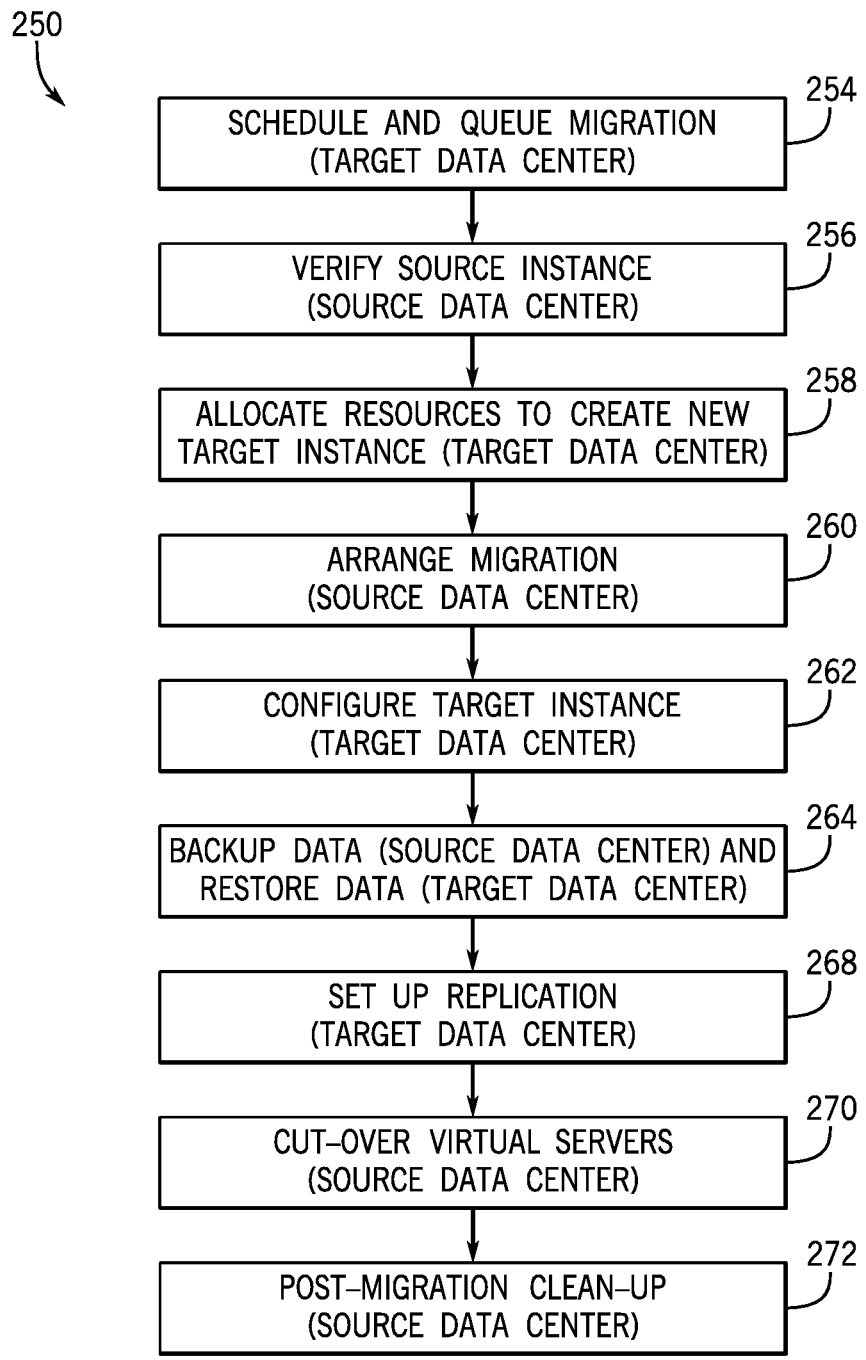
FIG. 5 is a flow diagram illustrating an example embodiment of a cross-cloud instance migration automation process, whereby an instance is migrated from a first cloud to a second cloud using the CS, in accordance with aspects of the present disclosure.

FIG. 5 is a flow diagram illustrating an example embodiment of a cross-cloud instance migration automation 250, which defines a cross-cloud migration process to move an instance from a first cloud to a second cloud while leveraging existing automations defined within the clouds. Additionally, FIGS. 6-14 are diagrams illustrating particular steps of the example cross-cloud instance migration automation 250 of FIG. 5. As such, the example of FIGS. 6-14 generally describes how the CS 230 of cloud 16A and the CS 230 of cloud 16B cooperate to allocate resources, transfer data, install nodes, redirect traffic, and release resources within the clouds 16. It may be noted that this example cross-cloud instance migration automation 250 is merely provided an example of a benefit of the disclosed CS 230, and is not intended to be limiting. Indeed, in other embodiments, a cross-cloud instance migration automation 250 may be implemented using the CS 230 having fewer steps, additional steps, repeated steps, and so forth, in accordance with the present disclosure. For this example it may be appreciated that, while the CS 230 of data center 18B executes the cross-cloud instance migration automation 250, portions of the cross-cloud instance migration automation 250 (e.g., sub-automations) may be executed by the respective CS 230 of data centers 18A or 18B in a local or cross-cloud manner, as discussed below. For additional clarity, the blocks of FIG. 5 include a parenthetical indication of which of the data centers 18 executing the various steps of the cross-cloud instance migration automation 250.

Figure 6:
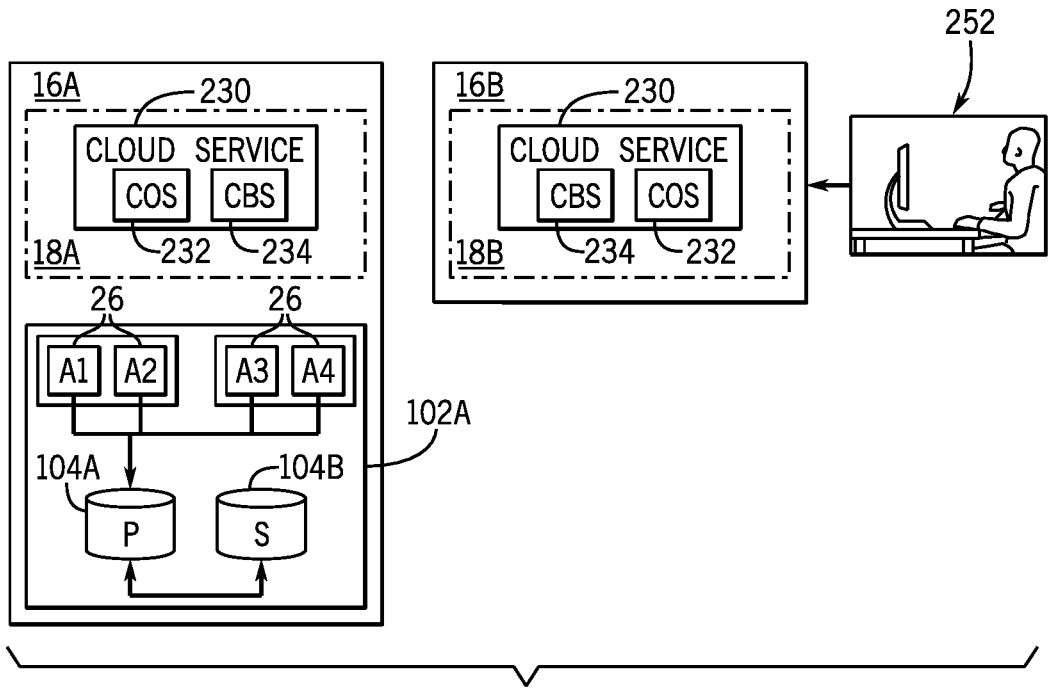
FIGS. 6, 7, 8, 9, 10, 11, 12, 13, and 14 are diagrams illustrating particular steps of the example cross-cloud instance migration automation of FIG. 5, in accordance with aspects of the present disclosure.

To facilitate discussion of the cross-cloud instance migration automation 250 of FIG. 5, FIG. 6 illustrates data center 18A (also referred to as the source data center 18A for this example), which hosts cloud 16A (also referred to as the source cloud 16A for this example), including client instance 102A (also referred to as the source instance 102A in this example). As discussed with respect to FIG. 2, the client instance 102A includes a number of virtual servers 26 (e.g., application servers) and database servers 104, including a primary database server 104A and a secondary database server 104B. Similarly, data center 18B (also referred to as the target data center 18B for this example) hosts cloud 16B (also referred to as the target cloud for this example), which may include any suitable number of instances (not shown).

As illustrated in FIG. 6, during operation, the CS 230 of data center 18B receives a request from an administrator 252 to execute a cross-cloud instance migration automation to move the client instance 102A from cloud 16A and data center 18A to cloud 16B and data center 18B. The cross-cloud instance migration automation 250 includes references or calls to other automations 220 hosted by data center 18A and by data center 18B, wherein these automations 220 are designed to locally handle resource allocation, instance replication/cloning, data backup/restore, fail-over, and so forth, for instances within clouds 16A and 16B, as discussed above. For the illustrated example, the COS 232 hosted by data center 18B determines that data center 18A hosts automations 220 used by the requested cross-cloud instance migration automation, and provides the CBS 234 of data center 18B with suitable information to communicate with data center 18A, as discussed above. In response to receiving the request to execute the cross-cloud instance migration automation, the CBS 234 of the data center 18B begins execution of the cross-cloud instance migration automation 250, as described by the cross-cloud instance migration automation 250 of FIG. 5. As noted, while the data center 18B is the instigator of the cross-cloud automation process being performed, portions of this process are executed locally by the data center 18B, while other portions are executed remotely by the data center 18A, for the present example.

Turning to FIG. 5, the example embodiment of the cross-cloud instance migration automation 250 begins with scheduling and queuing the migration (block 254). For example, as illustrated in FIG. 6, the CBS 234 of data center 18B executes a scheduling automation to schedule a time for the migration to begin, and also to queue the migration when the scheduled time has been reached. Since this scheduling automation only involves resources local to the data center 18B, the CBS 234 of the data center 18B locally executes the scheduling automation without accessing or involving the data center 18A. As noted above, the scheduling automation stored and executed by the data center 18B may be an existing automation designed for scheduling life cycle tasks for instances hosted by the data center 18B, and this existing automation can be leveraged by the example cross-cloud instance migration automation process without modification.

Figure 7:
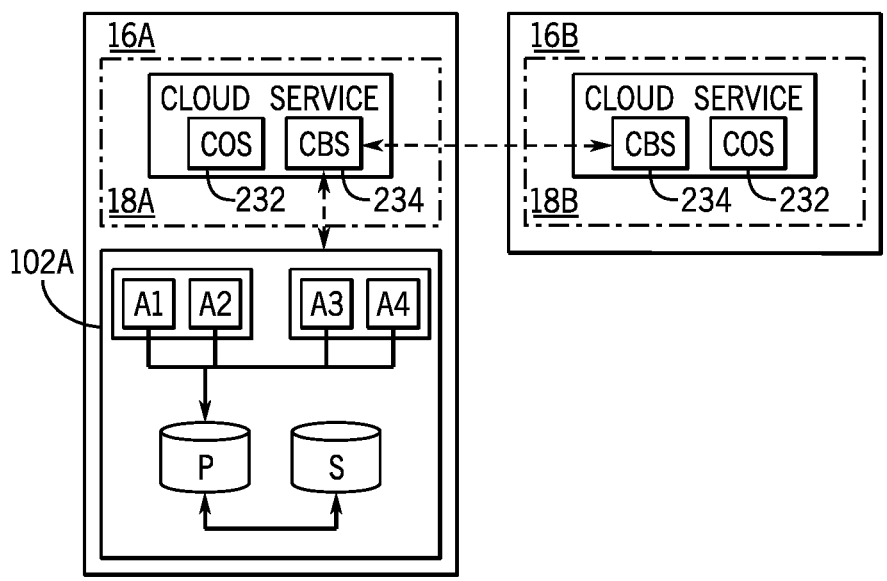

Continuing through the example cross-cloud instance migration automation 250 of FIG. 5, after scheduling and queuing the migration in block 254, the CBS 234 of the data center 18B may proceed by verifying the source instance (block 256). For example, as illustrated in FIG. 7, the CBS 234 of data center 18B executing the cross-cloud instance migration automation 250 then reaches instructions to execute an instance verification automation hosted by data center 18A. As discussed above, the CBS 234 of data center 18B transmits instructions to the CBS 234 of data center 18A to execute the instance verification automation. Since execution of this instance verification automation only involves resources local to data center 18A and cloud 16A, the CBS 234 of the data center 18A locally executes the instance verification automation against the instance 102A. Once execution of the instance verification automation is completed, the CBS 234 of data center 18A transmits the results of the execution (e.g., success/failure indications, configuration/capacity information) to the CBS 234 of data center 18B, which triggered the remote execution of the instance verification automation. For situations in which the data center 18B receives an indication that the instance 102 has failed verification, the CBS 234 of the data center 18B may discontinue execution of the cross-cloud instance migration automation 250 and log the failed verification for later administrator review. As noted above, the instance verification automation stored and executed by the data center 18A may be an existing automation designed for instance verification within the cloud 16A that can be leveraged by the example cross-cloud instance migration process without modification.

Figure 8:
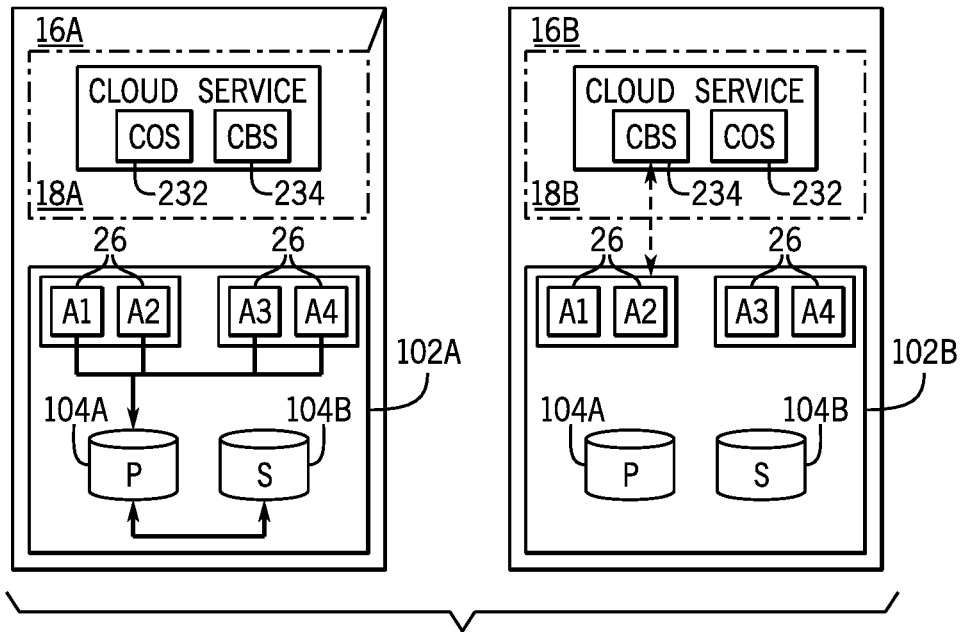

Continuing through the example cross-cloud instance migration automation 250 of FIG. 5, once the source instance 102A has been verified in block 256, the CBS 234 of the data center 18B may allocate resources to create a new instance 102B (also referred to herein as the target instance 102B) hosted by the cloud 16B (block 258). For example, as illustrated in FIG. 8, the CBS 234 of the data center 18B executes an acquire capacity automation to allocate resources of the data center 18B to host the instance 102A within the cloud 16B. For the illustrated example, the instance 102A includes four virtual servers 26 and database servers 104A and 104B. As such, the CBS 234 of the data center 18B may locally execute the acquire capacity automation to allocate four virtual servers 26 and database servers 104C and 104D within a newly defined target instance 102B of the cloud 16B. In certain embodiments, the data center 18B may receive information regarding the capacity of the client instance 102A as part of the response received from the execution of the instance verification automation by the data center 18A, as discussed with respect to block 256 and FIG. 6. In other embodiments, before executing the acquire capacity automation, the CBS 234 of data center 18B may first call a determine capacity automation to be locally executed by the CBS 234 of the data center 18A, and the CBS 234 of the data center 18A may respond by providing capacity information to the CBS 234 of the data center 18B. As noted above, the acquire capacity automation stored and executed by data center 18A, and the determine capacity automation stored and executed by data center 18B, may be existing automations designed for respectively determining or acquiring capacity within the clouds 16A and 16B, and these local automations can be leveraged by the example cross-cloud instance migration process without modification.

Figure 9:
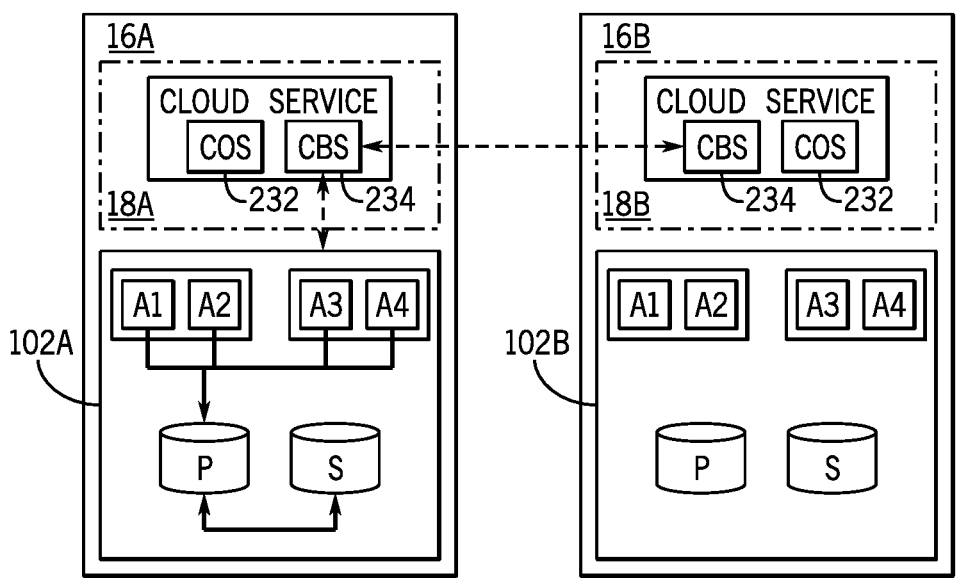

Continuing through the example cross-cloud instance migration automation 250 of FIG. 5, after allocating instance resources in block 258, the CBS 234 of data center 18B may arrange migration at the source data center 18A (block 260). For example, as illustrated in FIG. 9, the CBS 234 of the data center 18B may call for the execution of a migration management automation by the source data center 18A, wherein the call includes particular parameters for the migration. For example, the CBS 234 of the data center 18B may provide the CBS 234 of the data center 18A with a time window in which the migration will occur, as well as an IP address or uniform resource identifier (URI) of the target instance 102B. Using the received parameters, the CBS 234 of the data center 18A may execute the migration management automation, which provides information to administrators and users of the instance 102A regarding scheduled downtime, as well as the IP address or URI to access the instance 102B after migration is complete. Additionally, the CBS 234 of the data center 18A may locally execute a lock instance automation on the instance 102A to prevent changes to the structure or configuration of the instance 102A (e.g., the number of virtual servers 26, a structure of the data stored by the database servers 104). It may be appreciated that, while the instance 102A is locked to prevent configuration changes within the source instance 102A, the instance may remain active, enabling users to normally access the virtual servers 26 and access/modify data stored by the database servers 104A and 104B. Furthermore, in certain embodiments, the CBS 234 of the data center 18A may perform a more thorough validation of the source instance 102A as a part of the migration management automation, and may provide the CBS 234 of the data center 18B with more detailed information regarding the capacity and configuration of the source instance 102A. As noted above, the migration management automation and the lock instance automation stored and executed by data center 18A may be existing automations designed for scheduling migrations or locking instances within the cloud 16A, and these automations can be leveraged by the example cross-cloud instance migration process without modification.

Figure 10:
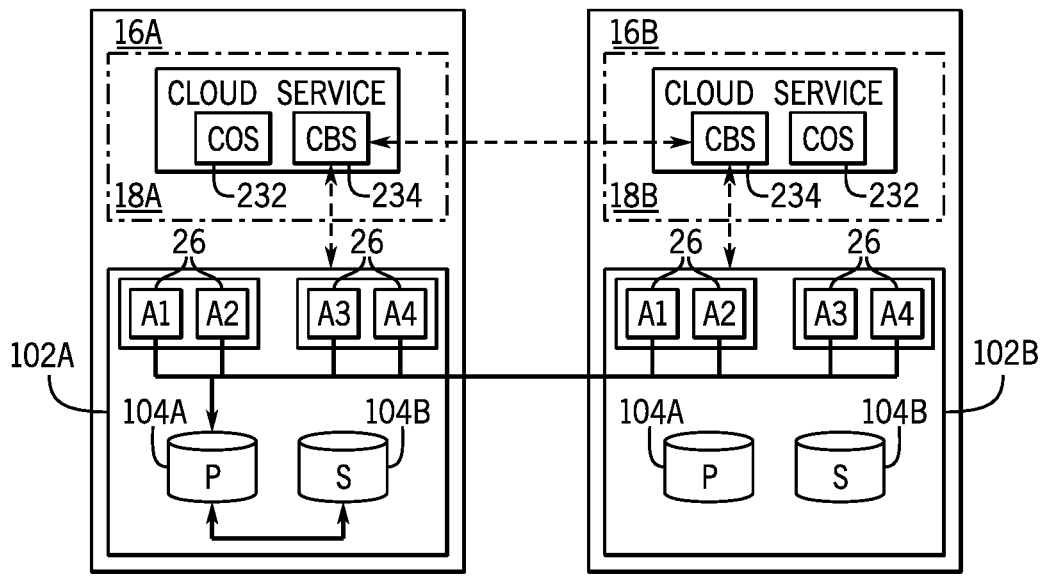

Continuing through the example cross-cloud instance migration automation 250 of FIG. 5, after scheduling the migration at the source data center 18A in block 260, the CBS 234 of the data center 18B may subsequently configure the target instance 102B (block 262). For example, as illustrated in FIG. 10, the CBS 234 of the data center 18B may locally execute a capacity validation automation to verify that the resources previously allocated to the instance 102B are sufficient to migrate the instance 102A. Once the capacity has been validated, the CBS 234 of the data center 18B may also locally execute a lock instance automation to prevent undesired changes to the structure or configuration of the instance 102B as it is being configured. Additionally, the CBS 234 of the data center 18B may execute an install instance automation that installs and configures the virtual servers 26 of the target instance 102B, based on the installation and configuration of the virtual server 26 of the source instance 102A. However, since the data stored by the database servers 104A and 104B of the source instance 102 has not yet been transferred to the target instance 102B, the virtual servers 26 of the target instance 102B are initially directed during installation to use the data stored in the primary database server 104A of the source instance 102A, as illustrated in FIG. 10. While illustrated as separate communication paths in FIG. 10, in certain embodiments, data requests to the database servers 104 of the source instance 102A from the virtual servers 26 of the target instance 102B may be routed through the CBS 234 of the data centers 18A and 18B in a seamless manner, as discussed above. As noted above, the capacity validation automation, the lock instance automation, and the install instance automation stored and executed by data center 18B may be existing automations designed for validating capacity, locking instances, or installing virtual servers within the cloud 16B, and these local automations can be leveraged by the example cross-cloud instance migration process without modification.

Figure 11:
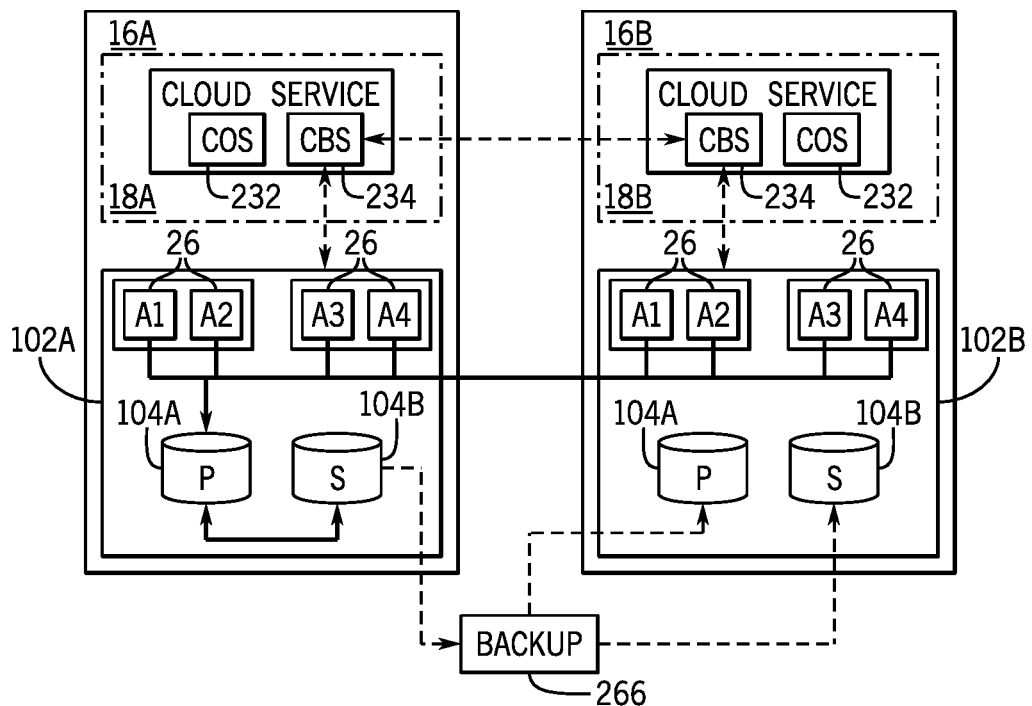

Continuing through the example cross-cloud instance migration automation 250 of FIG. 5, after configuring the target instance 102B in block 262, the CBS 234 of the data center 18B may subsequently advance to a backup and restore step (block 264). For example, as illustrated in FIG. 11, the CBS 234 of the data center 18B executing the cross-cloud instance migration automation 250 sends suitable instructions to the CBS 234 of the data center 18A requesting the execution of a database backup automation. In response, the CBS 234 of the data center 18A locally executes the database backup automation, which creates a backup copy 266 or snapshot of the data stored by the secondary database server 104B. Upon receiving an indication of successful execution of the backup automation and a location (e.g., a URI) of the backup copy 266, the CBS 234 of the data center 18B executes a database restore automation, which adds data from the backup copy 266 to database servers 104A and 104B of the target instance 102B. During the execution of this database restore automation, the CBS 234 of the source data center 18A seamlessly routes data of the backup copy 266 to the CBS 234 of the target data center 18B, as discussed above, to enable execution of the database restore automation at the target data center 18B. As noted above, the database backup automation stored and executed by data center 18A and the database restore automation stored and executed by data center 18B, may be existing automations designed for respectively backing up data or restoring data within the clouds 16A and 16B, and these local automations can be leveraged by the example cross-cloud instance migration process without modification.

Figure 12:
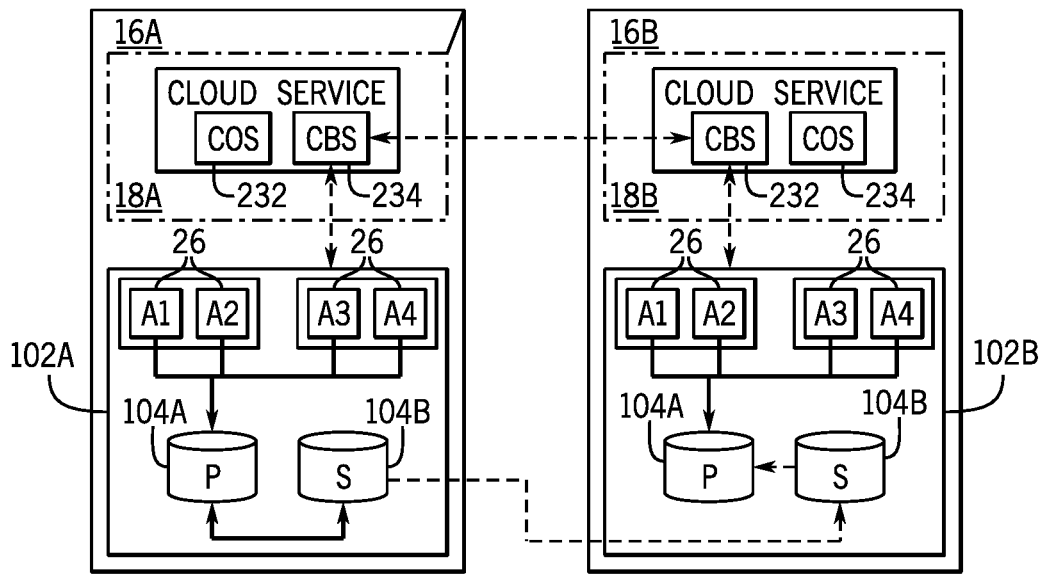

Continuing through the example cross-cloud instance migration automation 250 of FIG. 5, after performing the backup and restore of block 264, the CBS 234 of the data center 18B may subsequently set up replication in the target data center 18B (block 268). As mentioned, in certain embodiments, source instance 102A may remain active up to this point in the cross-cloud instance migration automation 250, in terms of providing users access to services and data hosted by the virtual servers 26 and the database servers 104A and 104B of the source instance 102A. As such, as illustrated in FIG. 12, during the replication step, the CBS 234 of the data center 18B may send instructions to the CBS 234 of the data center 18A requesting the local execution of a database lock automation that prevents further changes to the data stored by the database servers 104A and 104B of the source instance 102A. Additionally, as illustrated in FIG. 12, the CBS 234 of the data center 18B executes a database verification automation with parameters indicating that the data source is the secondary database server of the source instance 102A and that the data targets are the primary and secondary database servers 104A and 104 of the target instance 102B. For example, during execution of this database verification automation, the CBS 234 of the data center 18B may request that the CBS 234 of data center 18A locally execute a comparison automation, which compares the data currently stored by the database server 104B of the source instance 102A to the backup copy 266 (discussed with respect to block 264 and FIG. 11). In response to the CBS 234 of data center 18A executing this automation, the CBS 234 of data center 18B may receive an output that indicates all of the changes to the data (e.g., data entry, data modifications) that have occurred since the backup and restore operation of block 264. Using the received data, the CBS 234 of data center 18B may execute a database update automation, which updates the data stored by the secondary database server 104B of the target instance 102B. Finally, during this replication setup step, the CBS 234 of data center 18B may locally execute a database replication setup automation, which updates the primary database server 104A of the target instance 102B using the secondary database server 104B, and then establishes continuing replication operations between the primary database server 104A and the secondary database server 104B, as discussed above with respect to FIG. 2. As noted above, the database lock automation and the comparison automation stored and executed by data center 18B, and the database verification automation, the database update automation, and the database replication setup automation stored and executed by data center 18B, may be existing automations designed for respectively locking, comparing, verifying, updating, and replicating databases of instances within the clouds 16A and 16B, and these local automations can be leveraged by the example cross-cloud instance migration process without modification.

Figure 13:
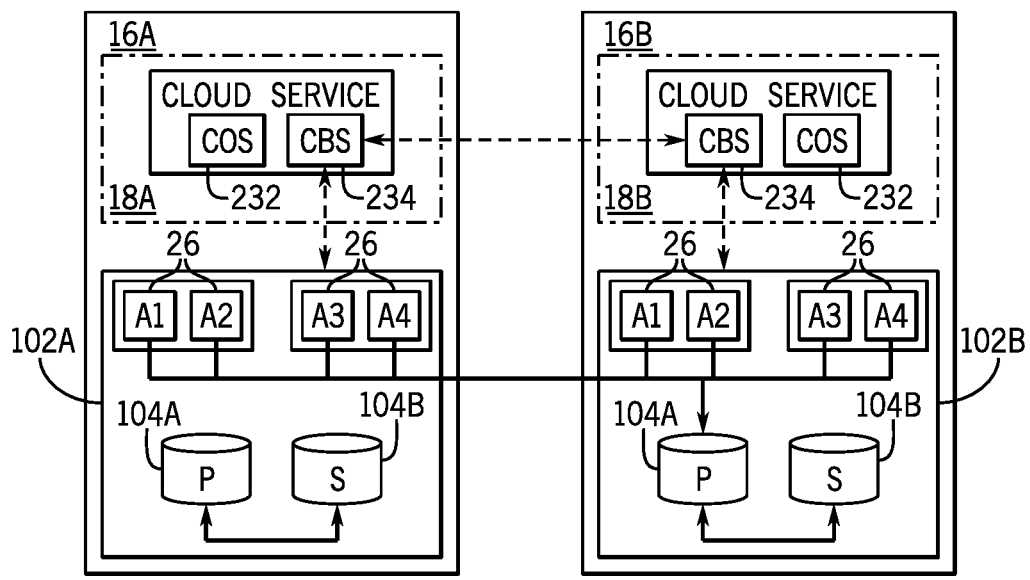

Continuing through the example cross-cloud instance migration automation 250 of FIG. 5, after setting up replication in the target instance 102B in block 268, the CBS 234 of the data center 18B may subsequently cut-over the virtual servers 26 of the source instance 102A (block 270). For example, as illustrated in FIG. 13, the CBS 234 of data center 18B may provide instructions to the CBS 234 of data center 18A requesting execution of a cut-over automation and includes parameters indicating the primary database server 104A of the target instance 102B as the data source. In response, the CBS 234 of data center 18A locally executes the cut-over automation, which redirects virtual servers 26 of the source instance 102A to use the primary database server 104A of the target instance 102B. As such, after executing the cut-over automation, any operation of the virtual servers 26 of the source instance 102A are performed using the data stored by the database server 104A of the target instance 102B. The CBS 234 of data center 18B may also locally execute a cut-over automation, which redirects virtual servers 26 of the target instance 102B to use the primary database server 104A of the target instance 102B. While illustrated as separate communication paths, in certain embodiments, data requests to the database servers 104A or 104B of the target instance 102B from the virtual servers 26 of the source instance 102A may be routed through the CBS 234 of the data centers 18A and 18B in a seamless manner, as discussed above. As noted above, the cut-over automations stored and executed by data centers 18A and 18B may be existing automations designed for respectively cutting over virtual servers 26 between instances within cloud 16A or 16B, and this local automation can be leveraged by the example cross-cloud instance migration process without modification.

Figure 14:
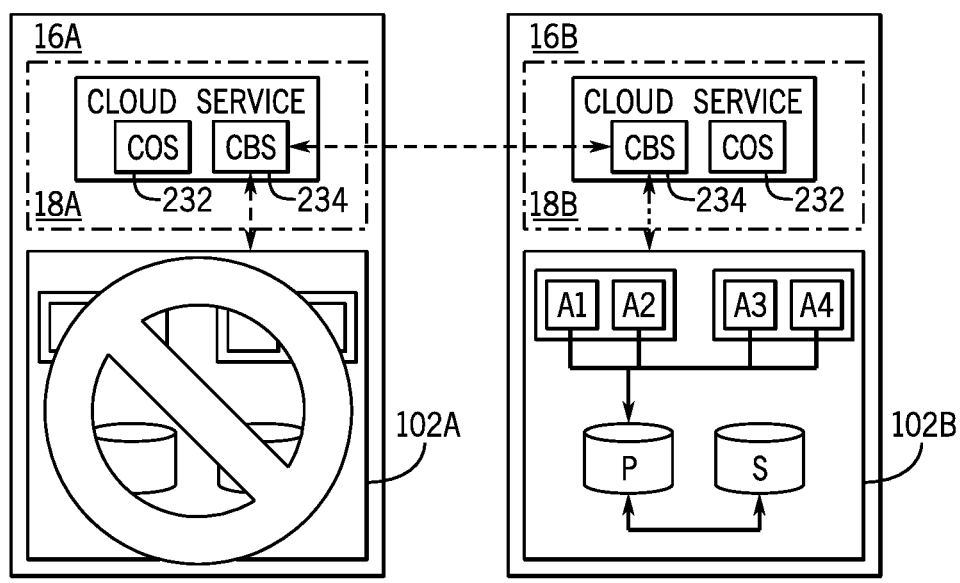

Continuing through the example cross-cloud instance migration automation 250 of FIG. 5, after performing the cut-over of block 270, the CBS 234 of the data center 18B may subsequently perform post-migration clean-up of the source instance 102A (block 272). For example, as illustrated in FIG. 14, the CBS 234 of data center 18B may provide instructions to the CBS 234 of data center 18A requesting execution of an instance clean-up automation and provide a parameter indicating the source instance 102A. In response, the CBS 234 of data center 18A may locally execute the instance clean-up automation, which may deactivate the source instance 102A and reclaim its resources (e.g., virtual servers 26, database servers 104, and corresponding memory and processing resources) for later allotment to other instances hosted by the data center 18A. In certain embodiments, the instance clean-up automation may perform other post-migration activities, such as setting up informational notices or redirects that point users requesting access to the retired source instance 102A to the target instance 102B, the data center 18B, and/or the cloud 16B. In certain embodiments, the CBS 234 of data center 18B may execute an instance validation automation before requesting execution of the instance clean-up automation, wherein the instance validation automation ensures that the source instance 102A and the target instance 102B are substantially the same before the source instance 102A is retired. For certain embodiments, the CBS 234 of data center 18B may access information regarding the source instance 102A via the CBS 234 of data center 18A. As noted above, the instance clean-up automation stored and executed by data center 18A and the instance validation automation stored and executed by data center 18B may be existing automations designed for respectively cleaning up or validating instances within the clouds 16A or 16B, and these local automations may be leveraged by the example cross-cloud instance migration process without modification.

The technical effects of the present disclosure include a cloud service (CS) that enables cross-cloud access to data and cross-cloud execution of orchestrations (e.g., scripts, workflows, and/or scheduled jobs). The CS includes a P2P COS and a CBS. The COS enables P2P identification and communication routing between different cloud computing environments, while the CBS enables cross-cloud access to data and orchestrations from different cloud computing environments. A data center may be configured to route all orchestration calls through the CS, such that the CS can ensure that references to local data and orchestrations are handled within the data center, while references to data and orchestrations of a different data center are suitably routed to be handled by a corresponding CS of the appropriate data center. As such, existing automations defined within a cloud computing environment can be leveraged by the CS to enable cross-cloud operations without modification, providing a considerable gain in efficiency, cost reduction, and error reduction. For example, using the disclosed CS, well-established local automations for allocation, replication/cloning, backup/restore, and so forth, of a cloud computing environment may be used to enable effective P2P, cross-cloud migration with minimal downtime, no data loss, and high move stability. Additionally, the CS can enable other cross-cloud operations, such as cross-cloud health monitoring. Furthermore, the CBS of the CS can be configured to restrict to local access certain data and/or orchestrations for enhanced security and/or regulatory compliance.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a first server group hosting a first cloud, wherein the first server group comprises:
processing circuitry; and
a memory, wherein the memory stores instructions of a first cloud service (CS) that, when executed by the processing circuitry, cause the processing circuitry to perform operations comprising:
establishing a peer-to-peer communication channel between the first CS of the first server group and a second CS of a second server group, wherein the second server group hosts a second cloud having a source instance to be migrated to a target instance of the first cloud; and
performing, via the first CS of the first server group, at least a portion of a cross-cloud instance migration automation, wherein the cross-cloud instance migration automation comprises:
allocating, via the first CS of the first server group, one or more virtual servers and one or more database servers of the target instance at the first server group;
installing and configuring, via the first CS of the first server group, the one or more virtual servers of the target instance based on a configuration of one or more virtual servers of the source instance; and
restoring, via the first CS of the first server group, a backup copy of data of the source instance to the first server group of the target instance.

2. The system of claim 1, wherein the second server group is configured to prevent any changes to the configuration of the one or more virtual servers while the cross-cloud instance migration automation is being performed.

3. The system of claim 1, wherein the one or more virtual servers are configured to use source instance data stored in the second server group before the backup copy of the data of the source instance is restored to the first server group of the target instance.

4. The system of claim 1, wherein the cross-cloud instance migration automation comprises transmitting, via the first CS of the first server group, a command to create the backup copy of the data of the source instance to the second server group after installing and configuring the one or more virtual servers of the target instance.

5. The system of claim 1, wherein the cross-cloud instance migration automation comprises transmitting, via the first CS of the first server group, a command to prevent any changes to source instance data stored in the second server group after restoring the backup copy of the data of the source instance to the first server group of the target instance.

6. The system of claim 1, wherein the operations comprise transmitting, to the second server group, timing data indicative of a time period during which the cross-cloud instance migration automation is expected to be performed.

7. The system of claim 6, wherein the second CS of the second server group is configured to provide an indication of downtime of the source instance to one or more user devices associated with the source instance after receiving the timing data indicative of the time period.

8. A method, comprising:
establishing a peer-to-peer communication channel between a first cloud service (CS) of a first server group and a second CS of a second server group, wherein the first server group hosts a first cloud having a target instance, and wherein the second server group hosts a second cloud having a source instance to be migrated to the target instance of the first cloud; and
performing, via the first CS of the first server group and the second CS of the second server group, a cross-cloud instance migration automation, wherein the cross-cloud instance migration automation comprises:
allocating, via the first CS of the first server group, one or more virtual servers and one or more database servers of the target instance at the first server group;
installing and configuring, via the first CS of the first server group, the one or more virtual servers of the target instance based on a configuration of one or more virtual servers of the source instance; and
restoring, via the first CS of the first server group, a backup copy of data of the source instance to the first server group of the target instance.

9. The method of claim 8, wherein the cross-cloud instance migration automation comprises deactivating, via the second CS of the second server group, the source instance.

10. The method of claim 8, wherein the cross-cloud instance migration automation comprises preventing, via the second CS of the second server group, any changes to source instance data stored in the second server group after restoring the backup copy of the data of the source instance to the first server group of the target instance.

11. The method of claim 10, wherein the cross-cloud instance migration automation comprises comparing, via the second CS of the second server group, the source instance data stored in the second server group to the backup copy of the data of the source instance.

12. The method of claim 8, wherein the cross-cloud instance migration automation comprises receiving, via the first CS of the first server group, one or more indications of respective changes that have occurred to source instance data based on a comparison between the source instance data stored in the second server group and the backup copy of the data of the source instance.

13. The method of claim 12, wherein the cross-cloud instance migration automation comprises updating the backup copy of the data of the source instance stored in the first server group based on the one or more indications of the respective changes that have occurred to the source instance data.

14. One or more non-transitory, computer-readable media at least collectively storing instructions of a first cloud service (CS) executable by processing circuitry of a first server group hosting a first cloud, wherein the instructions, when executed by the processing circuitry, cause the processing circuitry to perform operations comprising:
    establishing a peer-to-peer communication channel between the first CS of the first server group and a second CS of a second server group, wherein the second server group hosts a second cloud having a source instance to be migrated to a target instance of the first cloud; and
    performing, via the first CS of the first server group, at least a portion of a cross-cloud instance migration automation, wherein the cross-cloud instance migration automation comprises:
    allocating, via the first CS of the first server group, one or more virtual servers and one or more database servers of the target instance at the first server group;
    installing and configuring, via the first CS of the first server group, the one or more virtual servers of the target instance based on a configuration of one or more virtual servers of the source instance; and
    restoring, via the first CS of the first server group, a backup copy of data of the source instance to the first server group of the target instance.

15. The one or more non-transitory, computer-readable media of claim 14, wherein the cross-cloud instance migration automation comprises receiving, via the first CS of the first server group, capacity data indicative of capacity information from the second server group.

16. The one or more non-transitory, computer-readable media of claim 15, wherein the one or more virtual servers and the one or more database servers of the target instance are allocated based on the capacity data indicative of the capacity information.

17. The one or more non-transitory, computer-readable media of claim 14, wherein the cross-cloud instance migration automation comprises scheduling, via the first CS of the first server group, a time to migrate the source instance of the second cloud to the target instance of the first cloud.

18. The one or more non-transitory, computer-readable media of claim 14, wherein the cross-cloud instance migration automation comprises verifying, via the first CS of the first server group, the source instance of the second cloud.

19. The one or more non-transitory, computer-readable media of claim 18, wherein verifying the source instance comprises:
    transmitting, via the first CS of the first server group, a request to the second server group to execute an instance verification automation of the source instance; and
    receiving, via the first CS of the first server group, results data indicative of one or more results of execution of the instance verification automation from the second server group.

20. The one or more non-transitory, computer-readable media of claim 19, wherein the results data indicative of the one or more results of the execution of the instance verification automation comprises a first data set indicative of a successful verification of the source instance, a second data set indicative of an unsuccessful verification of the source instance, a third data set indicative of configuration information associated with the source instance, or a fourth data set indicative of capacity information associated with the source instance, or a combination thereof.

* * * * *